US012801864B2

(12) United States Patent
Dar et al.

(10) Patent No.: US 12,801,864 B2
(45) Date of Patent: Nov. 17, 2026

(54) MACHINE LEARNING-BASED QUERY PROCESSING OF DOCUMENTS INCLUDING INDEXED TABULAR DATA STRUCTURES

(71) Applicant: Dell Products L.P., Round Rock, TX (US)

(72) Inventors: Shaul Dar, Petach Tikva (IL); Ramakanth Kanagovi, Hyderabad (IN); Guhesh Swaminathan, Chennai (IN); Rajan Kumar, Nawada (IN)

(73) Assignee: Dell Products L.P., Round Rock, TX (US)

( * ) Notice: Subject to any disclaimer, the term of this patent is extended or adjusted under 35 U.S.C. 154(b) by 234 days.

(21) Appl. No.: 18/589,327

(22) Filed: Feb. 27, 2024

(65) Prior Publication Data

US 2025/0272507 A1 Aug. 28, 2025

(51) Int. Cl.

*G06F 40/40* (2020.01)
*G06F 16/2452* (2019.01)

(Continued)

(52) U.S. Cl.

CPC .............. *G06F 40/40* (2020.01); *G06F 40/18* (2020.01); *G06F 40/205* (2020.01);

(Continued)

(58) Field of Classification Search

None

See application file for complete search history.

(56) References Cited

U.S. PATENT DOCUMENTS 6,675,174 B1 * 1/2004 Bolle ..................... G06V 20/40 707/999.102
8,495,036 B2 * 7/2013 Calder .................. G06F 16/215 707/696

(Continued)

FOREIGN PATENT DOCUMENTS

KR 20230075322 A * 5/2023 ............. G06F 16/33
WO WO2024/054286 * 6/2023 ............. G06F 30/33

OTHER PUBLICATIONS

P. Lewis et al., "Retrieval-Augmented Generation for Knowledge-Intensive NLP Tasks," arXiv:2005.11401v4, Apr. 12, 2021, 19 pages.

(Continued)

*Primary Examiner* — Farzad Kazeminezhad
(74) *Attorney, Agent, or Firm* — Ryan, Mason & Lewis, LLP

(57) ABSTRACT

An apparatus comprises at least one processing device configured to obtain a query comprising search text and a context identifying documents including tabular data structures to be searched using the search text, and to generate document chunks by parsing the documents, the tabular data structures being replaced in the document chunks with tabular data structure representations that maintain tabular formatting of the tabular data structures. The at least one processing device is further configured to select a subset of the document chunks based at least in part on determining a similarity between the document chunks and the search text, to generate a prompt for input to a machine learning system comprising the selected document chunks, and to provide an answer to the query that comprises content from at least one of the tabular data structures based at least in part on an output of the machine learning system.

20 Claims, 15 Drawing Sheets

(51) Int. Cl.

*G06F 16/2457* (2019.01)
*G06F 40/126* (2020.01)
*G06F 40/18* (2020.01)
*G06F 40/197* (2020.01)
*G06F 40/205* (2020.01)
*G06F 40/216* (2020.01)
*G06F 40/284* (2020.01)
*G06F 40/30* (2020.01)
*G06V 30/412* (2022.01)

(52) U.S. Cl.

CPC ...... *G06V 30/412* (2022.01); *G06F 16/24524* (2019.01); *G06F 16/24578* (2019.01); *G06F 40/126* (2020.01); *G06F 40/197* (2020.01); *G06F 40/216* (2020.01); *G06F 40/284* (2020.01); *G06F 40/30* (2020.01)

(56) References Cited

U.S. PATENT DOCUMENTS 9,921,730 B2 * 3/2018 Burke ..................... G06F 40/18
12,147,758 B1 * 11/2024 Thomas .................. G06F 40/18
2012/0330954 A1 * 12/2012 Sivasubramanian ........................ G06F 16/278 707/E17.089
2014/0046950 A1 * 2/2014 Zelek ................ G06F 16/24557 707/E17.049
2016/0012052 A1 * 1/2016 Zoryn ............... G06F 16/24578 707/728
2019/0384846 A1 * 12/2019 Mathur ............. G06F 16/24524
2022/0318545 A1 * 10/2022 Poff ..................... G06V 30/412
2022/0382961 A1 * 12/2022 Schmidtke ............ G06F 40/197
2024/0242024 A1 * 7/2024 Moon ................... G06F 40/126

OTHER PUBLICATIONS

S. Vivek, "Build Industry-Specific LLMs Using Retrieval Augmented Generation," https://towardsdatascience.com/build-industry-specific-llms-using-retrieval-augmented-generation-af9e98bb6f68, May 31, 2023, 8 pages.

Dell Technologies, "Dell PowerStore Installation and Service Guide for PowerStore 1000, 1200, 3000, 3200, 5000, 5200, 7000, 9000, and 9200," Version 3.x, Rev. A17, Nov. 2023, 238 pages.

Python Software Foundation, "PDFMiner," https://pypi.org/project/pdfminer/, Nov. 25, 2019, 5 pages.

Github, "jsvine/pdfplumber," https://github.com/jsvine/pdfplumber, Accessed Feb. 12, 2024, 14 pages.

Langchain, Inc., "Introduction-Langchain," https://python.langchain.com/docs/get_started/introduction, Accessed Feb. 5, 2024, 14 pages.

* cited by examiner

300

| Table 4: Embedded module LEDs | | | |
|---|---|---|---|
| **LED** | **Location** | **State** | **Description** |
| Unsafe to remove | 1 | White | Do not remove the node, improper removal could cause data loss. |
| | | Off | Safe to remove the node when the node has been properly prepared. |
| Node power | 2 | Green | Node is on (main power). |
| | | Green blinking | Node is initializing a serial over LAN session. |
| | | Off | Node is off. |
| Node fault | 3 | Amber | Fault has occurred. |
| | | Blue | Node in Degraded Mode. |
| | | Amber or blue blinking | System is booting. |
| | | Blue and amber alternating (green for 3 seconds) | System uninitialized. A management IP address has not been assigned. |
| | | Blue and amber alternating at one second intervals | Node in Service Mode. |
| Port link | 4 | Green | Link up with high speed. |
| | | Amber | Link up with degraded speed. |
| | | Off | Link down. |
| Ethernet port activity | 5 | Amber blinking | Port activity. |
| | | Off | No port activity. |
| Ethernet port link | 6 | Green | Link established. |
| | | Off | No link established. |
| 2-port 100GbE card port link | 7 | Green | Link established. |
| | | Off | No link established. |
| Embedded module fault | 8 | Amber | Embedded module has faulted. |
| | | Off | No fault has occurred, normal operation. |
| 2-port 100GbE card port activity | 9 | Green blinking | Port activity. |
| | | Off | No port activity. |

305

FIG. 3A

310

Query: What can be different Embedded LED states for a Node Fault along with the description?

315

Answer:
-Node fault LED state: Amber
-Description: Indicates that a fault has occurred in the node

320

Answer:
-Node fault LED: Amber state indicates that a fault has occurred in the embedded module.
-Node fault LED: Blue state indicates that the node is in Degraded Mode.
-Node fault LED: Amber or blue blinking state indicates that the system is booting.
-Node fault LED: Blue and amber alternating state indicates that the system is uninitialized and a management IP address has not been assigned.
-Node fault LED: Blue and amber alternating at one-second intervals state indicates that the node is in Service Mode.

FIG. 3B

400

Table 3: Base Enclosure AC power supply LEDs

| LED | Location | State | Description |
|---|---|---|---|
| Fault | 1 | Solid amber | Power supply or backup fault. Check cable connection. |
| | | Off | No fault. |
| Supply output status | 2 | Green | Outputs are normal. |
| | | Off | Outputs are faulted or disabled. |
| AC power (input) | 3 | Green | AC power is on. |
| | | Off | Ac power is off. Verify source power. |

405

Table 3. Base enclosure ac power supply LEDs
LED Location State Description
Fault Solid amber Power supply or backup fault. Check cable connection.
Off No fault.
Supply output status Green Outputs are normal.
Off Outputs are faulted or disabled.
AC power (input) Green AC power is on.
Off AC power is off. Verify source power.

FIG. 4

500

Identify a faulted power supply using System Manager

Before you replace a power supply, ensure that you have identified its location within the system. Using System Manager, you can identify and locate a faulted power supply.

Steps
1. From System Manager, select Hardware.
2. Select the appliance that includes the power supply that you need to replace.
3. On the Components card, under Rear View, expand BaseEnclosure.
4. Expand the node that includes the power supply, and then select PSU0.
   Faulted parts appear in red in the image of the system, and report a status of `Faulted` in the State field.

Base enclosure power supply LEDs
Use the fault LEDs to identify the faulted part.

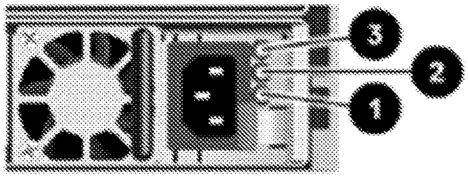

FIG. X. Base enclosure power supply LEDs

| Table 3: Base Enclosure AC power supply LEDs | | | |
|---|---|---|---|
| **LED** | **Location** | **State** | **Description** |
| Fault | 1 | Solid amber | Power supply or backup fault. Check cable connection. |
| | | Off | No fault. |
| Supply output status | 2 | Green | Outputs are normal. |
| | | Off | Outputs are faulted or disabled. |
| AC power (input) | 3 | Green | AC power is on. |
| | | Off | Ac power is off. Verify source power. |

Remove a power supply
*About this task*
There are two power supplies. The power supplies are installed in the top and bottom nodes, and the top power supply is installed upside-down. This procedure works for removing either power supply, however, the direction in which the retention bail and release handle are pressed is reversed for the upside-down power supply.

NOTE: You do not need to power down the system to remove a power supply.

Steps
1. Rotate the power cable retention bail to the left (to the right for the upside-down power supply). Remove the power cable from the power supply.

FIG. 5A

505

Identify a faulted power supply using System Manager
Before you replace a power supply, ensure that you have identified its location within the system. Using System Manager, you can identify and locate a faulted power supply.
Steps
1. From System Manager, select Hardware.
2. Select the appliance that includes the power supply that you need to replace.
3. On the Components card, under Rear View, expand BaseEnclosure.
4. Expand the node that includes the power supply, and then select PSU0.

Faulted parts appear in red in the image of the system, and report a status of Faulted in the State field.
Base enclosure power supply LEDs
Use the fault LEDs to identify the faulted part.
FIG. X. Base enclosure power supply LEDs
Table 3. Base enclosure AC power supply LEDs

| LED | Location | State | Description |
|---|---|---|---|
| Fault | | Sold amber | Power supply or backup fault. Check cable connection. |
| | | Off | No fault. |
| Supply output status | | Green | Outputs are normal. |
| | | Off | Outputs are faulted or disabled. |
| AC power (input) | | Green | AC power is on. |
| | | Off | AC power is off. Verify source power. |

Remove a power supply
About this task
There are two power supplies. The power supplies are installed in the top and bottom nodes, and the top power supply is installed upside-down. This procedure works for removing either power supply, however, the direction in which the retention bail and release handle are pressed is reversed for the upside-down power supply.
NOTE: You do not need to power down the system to remove a power supply.
Steps
1. Rotate the power cable retention bail to the left (to the right for the upside-down power supply). Remove the power cable from the power supply.

FIG. 5B

600

Query: What can be different Embedded LED states for a Node Fault along with the description?

Answer:
-The LED for Node Fault can be in an Amber state, indicating that a fault has occurred.
-It can also be in a Blue state, indicating that the node is in Degraded Mode.
-The LED can be blinking amber or blue, indicating that the system is booting.
-In the case of a node being uninitialized, the LED can alternate between blue and amber.
-If the node is in Service Mode, the LED can alternate between blue and amber at one-second intervals.

Source:

Table 4: Embedded module LEDs

| LED | Location | State | Description |
|---|---|---|---|
| Unsafe to remove | | White | Do not remove the node, improper removal could cause data loss. |
| | | Off | Safe to remove the node when the node has been properly prepared. |
| Node power | | Green | Node is on (main power). |
| | | Green blinking | Node is initializing a serial over LAN session. |
| | | Off | Node is off. |
| Node fault | | Amber | Fault has occurred. |
| | | Blue | Node in Degraded Mode. |
| | | Amber or blue blinking | System is booting. |
| | | Blue and amber alternating (green for 3 seconds) | System uninitialized. A management IP address has not been assigned. |
| | | Blue and amber alternating at one second intervals | Node in Service Mode. |
| Port link | | Green | Link up with high speed. |
| | | Amber | Link up with degraded speed. |
| | | Off | Link down. |
| Ethernet port activity | | Amber blinking | Port activity. |
| | | Off | No port activity. |
| Ethernet port link | | Green | Link established. |
| | | Off | No link established. |
| 2-port 100GbE card port link | | Green | Link established. |
| | | Off | No link established. |
| Embedded module fault | | Amber | Embedded module has faulted. |
| | | Off | No fault has occurred, normal operation. |
| 2-port 100GbE card port activity | | Green blinking | Port activity. |
| | | Off | No port activity. |

FIG. 6

700

Human: If I give you some paragraphs, can you use them to answer the question {prompt_text}?

Assistant: Sure. I'll keep my answer relevant to the question.

Human: You have few instructions to follow while answering:
1. Remember to only use information provided in paragraphs and provide direct answers.
2. Don't answer questions you are not sure about.
3. Try to provide answers as bullet pointed answer if possible.
4. If you are not able to find a right answer, please ask to reframe the question.
5. You will see lines starting with "Table" followed by numbers and title. This is a placeholder for tables relevant to the provided context. Kindly include them in the answer if relevant so that, I can append the original table to it.
6. For the above placeholder, please use this format - Text | Table 1.
7. Do not include irrelevant tables Assistant: Noted. Please provide me the paragraphs.

Human: Here they are {context}

FIG. 7

900

Installation power overview

Follow these guidelines for when to power on your system during various installation scenarios.

NOTE:

Table 1: Installing expansion enclosures during the initial system installation

| **Installation Scenario** | **Order of Operations** |
| --- | --- |
| Installing just a base enclosure | 1. Install the base enclosure.<br>2. Plug in the power cables. |
| Installing a base enclosure and expansion enclosures | 1. Install the base enclosure and expansion enclosures.<br>2. Cable the expansion enclosure to the base enclosure.<br>3. Plug in the power cables. |

Table 2: Adding expansion enclosures to a running system

| **Installation Scenario** | **Order of Operations** |
| --- | --- |
| Adding the first expansion enclosure | 1. Install the expansion enclosure.<br>2. Cable the expansion enclosure to the base enclosure.<br>3. Plug in the power cables. |
| Adding a second expansion enclosure | 1. Install the expansion enclosure.<br>2. Plug in the power cables.<br>3. Move the loopback cables and then add two new cables. |
| Adding a third expansion enclosure | 1. Install the expansion enclosure.<br>2. Plug in the power cables.<br>3. Move the loopback cables and then add two new cables. |

FIG. 9A

905

Query: What are the guidelines for powering on the system while adding a second expansion enclosure?

Answer:
The guidelines for powering on the system while adding a second expansion enclosure are as follows:
-Install the expansion enclosure.
-Plug in the power cables.
-Move the loopback cables and then add two new cables.

Source:

Table 2: Adding expansion enclosures to a running system

| Installation Scenario | Order of Operations |
|---|---|
| Adding the first expansion enclosure | 1. Install the expansion enclosure.<br>2. Cable the expansion enclosure to the base enclosure.<br>3. Plug in the power cables. |
| Adding a second expansion enclosure | 1. Install the expansion enclosure.<br>2. Plug in the power cables.<br>3. Move the loopback cables and then add two new cables. |
| Adding a third expansion enclosure | 1. Install the expansion enclosure.<br>2. Plug in the power cables.<br>3. Move the loopback cables and then add two new cables. |

FIG. 9B

1000

| Component | | Quantity |
|---|---|---|
| NVMe expansion enclosure | 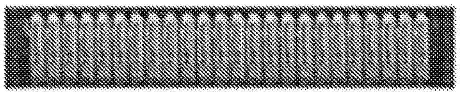 | 1 |
| Rail kit, including:<br>Snap-in rails (2)<br>Screws (2 per rail) | 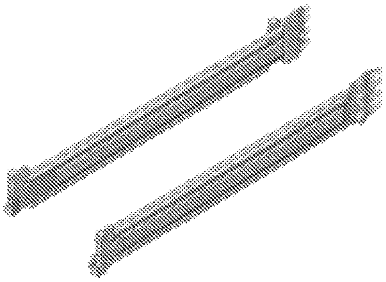 | 1 |
| Cable management arms |  | 2 |
| Power cords, either:<br>Black and gray C13/C14<br>Black and gray C13/C20 |  | 2 |
| Bezel for NVMe expansion enclosure (with key) | 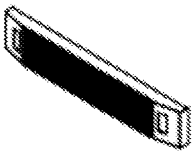 | 1 |
| 100G QSFP28 cables to connect the base enclosure to the NVMe expansion enclosure or another NVMe expansion enclosure, and to loopback from the NVME expansion enclosure to the base enclosure.<br>NOTE: The first NVMe expansion enclosure ships four 100G QSFP28 cables. The second and third NVMe expansion enclosures ship with two 100G QSFP28 cables. | 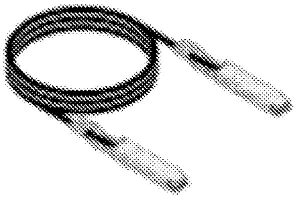 | 2 |

FIG. 10

MACHINE LEARNING-BASED QUERY PROCESSING OF DOCUMENTS INCLUDING INDEXED TABULAR DATA STRUCTURES

BACKGROUND

As the value and use of information continues to increase, individuals and businesses seek additional ways to process and store information. Information processing systems may be used to process, compile, store and communicate various types of information. Because technology and information processing needs and requirements vary between different users or applications, information processing systems may also vary (e.g., in what information is processed, how the information is processed, how much information is processed, stored, or communicated, how quickly and efficiently the information may be processed, stored, or communicated, etc.). Information processing systems may be configured as general purpose, or as special purpose configured for one or more specific users or use cases (e.g., financial transaction processing, airline reservations, enterprise data storage, global communications, etc.). Information processing systems may include a variety of hardware and software components that may be configured to process, store, and communicate information and may include one or more computer systems, data storage systems, and networking systems. Various search algorithms may be used for searching the information stored in information processing systems.

SUMMARY

Illustrative embodiments of the present disclosure provide techniques for machine learning-based query processing of documents including tabular data structures.

In one embodiment, an apparatus comprises at least one processing device comprising a processor coupled to a memory. The at least one processing device is configured to obtain a query, the query comprising search text and a context, the context identifying one or more documents to be searched using the search text, at least one of the one or more documents comprising one or more tabular data structures. The at least one processing device is also configured to generate a plurality of document chunks by parsing the one or more documents, each of the plurality of document chunks comprising a portion of content of one of the one or more documents, wherein the one or more tabular data structures are replaced in the plurality of document chunks by one or more tabular data structure representations that maintain a tabular formatting of the one or more tabular data structures. The at least one processing device is further configured to select a subset of the plurality of document chunks based at least in part on determining a similarity between content of the plurality of document chunks and the search text, the selected subset of the plurality of document chunks comprising at least one document chunk comprising at least one of the one or more tabular data structure representations. The at least one processing device is further configured to generate, based at least in part on the query, a prompt for input to a machine learning system, the prompt comprising the selected subset of the plurality of document chunks, to apply the prompt to the machine learning system to generate an output, and to provide an answer to the query based at least in part on the output of the machine learning system, the answer comprising at least a portion of content from at least one of the one or more tabular data structures.

These and other illustrative embodiments include, without limitation, methods, apparatus, networks, systems and processor-readable storage media.

BRIEF DESCRIPTION OF THE DRAWINGS

FIGS. 3A and 3B show an example of table data provided as context for a query to a large language model, and output from the large language model without and with use of an enhanced retrieval augmented generation approach with table comprehension in an illustrative embodiment.

FIG. 4 shows an example of unformatted text extraction of table content in an illustrative embodiment.

FIGS. 5A and 5B show an example of formatted text extraction of table content from a document in an illustrative embodiment.

FIG. 6 shows a query and answer from a large language model implementing an enhanced retrieval augmented generation approach with table comprehension in an illustrative embodiment.

FIG. 7 shows an example of prompt engineering for a large language model to utilize an enhanced retrieval augmented generation approach with table comprehension in an illustrative embodiment.

FIGS. 9A and 9B show an example of selection of multiple tables for an answer output by a large language model with an enhanced retrieval augmented generation approach with table comprehension in an illustrative embodiment.

FIG. 10 shows an example of table data that contains images in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
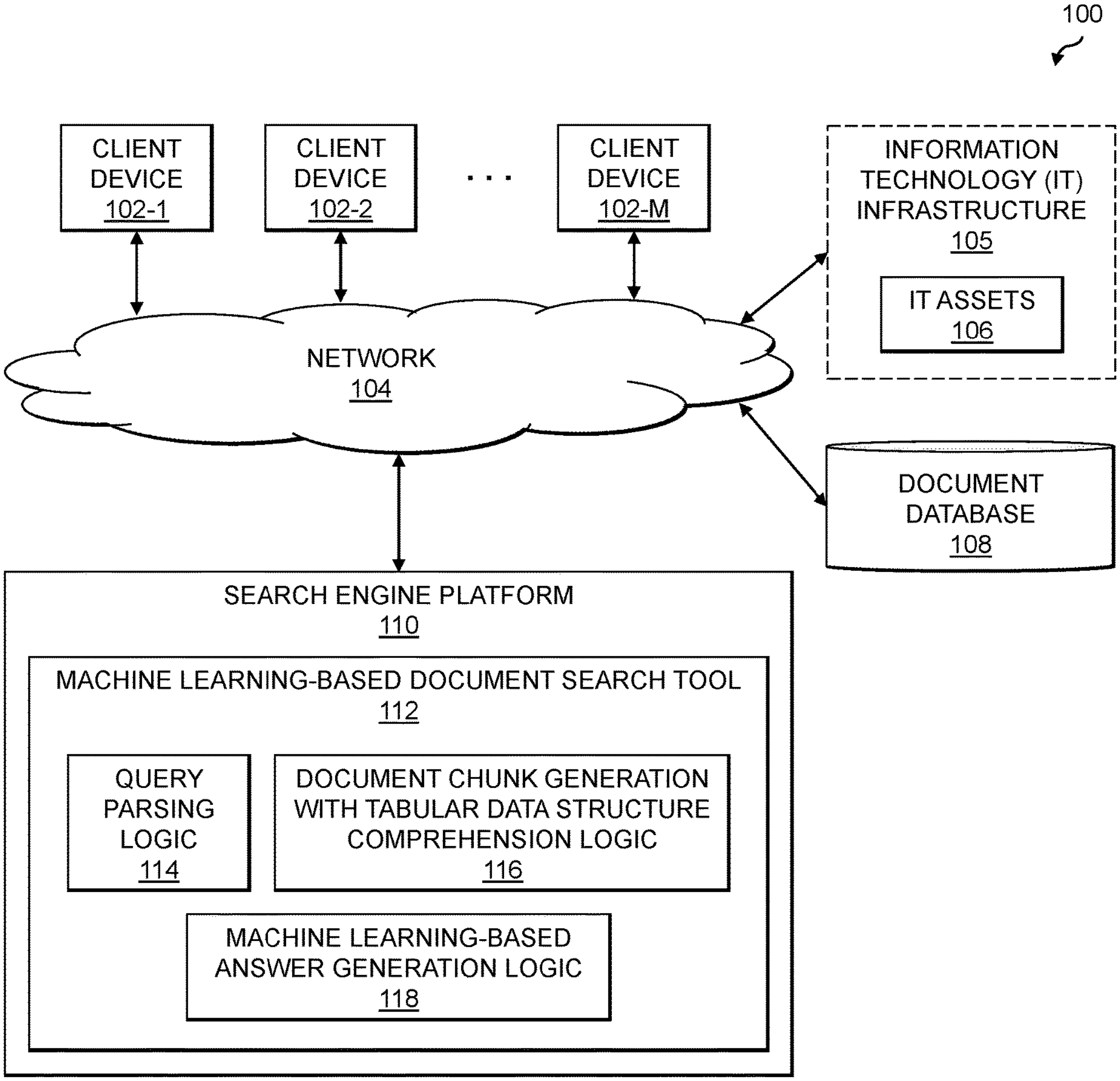
FIG. 1 is a block diagram of an information processing system configured for machine learning-based query processing of documents including tabular data structures in an illustrative embodiment.

FIG. 1 shows an information processing system 100 configured in accordance with an illustrative embodiment.

The information processing system 100 is assumed to be built on at least one processing platform and provides functionality for machine learning-based query processing of documents including tabular data structures. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, a document database 108, and a search engine platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the search engine platform 110 is used for an enterprise system. For example, an enterprise may subscribe to or otherwise utilize the search engine platform 110 for performing searches or queries related to documents stored in the document database 108, documents produced by or otherwise related to operation of the IT assets 106 of the IT infrastructure 105, etc. For example, users of the client devices 102 may submit searches or queries to the search engine platform 110 to perform intelligent searching of documents from the document database 108, where such documents may but are not required to be produced by or otherwise associated with operation of the IT assets 106 of the IT infrastructure 105. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The document database 108 is configured to store and record various information that is utilized by the search engine platform 110 and the client devices 102. Such information may include, for example, information that is collected regarding operation of the IT assets 106 of the IT infrastructure 105 (e.g., support tickets, logs, etc.). The search engine platform 110 may be utilized by the client devices 102 to perform searches of such information in order to perform troubleshooting and remediation of issues encountered on the IT assets 106 of the IT infrastructure 105. The document database 108 may also or alternatively store information regarding technical guides, support documents, etc. relating to configuration and operation of the IT assets 106 of the IT infrastructure 105. The client devices 102 may utilize the search engine platform 110 to query such technical guides, support documents, etc. to assist in performing configuration of the IT assets 106 of the IT infrastructure 105, to perform troubleshooting and remediation of issues encountered on the IT assets 106 of the IT infrastructure 105. The document database 108 may also store any documents or other information that is desired to be searched utilizing the search engine platform 110, including information that is unrelated to the IT assets 106 of the IT infrastructure 105.

The document database 108 may be implemented utilizing one or more storage systems. The term "storage system" as used herein is intended to be broadly construed. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the search engine platform 110, as well as to support communication between the search engine platform 110 and other related systems and devices not explicitly shown.

The search engine platform 110 may be provided as a cloud service that is accessible by one or more of the client devices 102 to allow users thereof to perform searching of a set of input documents, including documents that contain data structures such as tables. The client devices 102 may be configured to access or otherwise utilize the search engine platform 110 (e.g., to perform searches, including searches related to configuration of the IT assets 106 of the IT infrastructure 105, operation of the IT assets 106 of the IT infrastructure 105, issues encountered on the IT assets 106 of the IT infrastructure 105, troubleshooting and remediation of issues encountered on the IT assets 106 of the IT infrastructure 105, etc.). In some embodiments, the client devices 102 are assumed to be associated with software developers, system administrators, IT managers or other authorized personnel responsible for managing the IT assets 106 of the IT infrastructure 105. In some embodiments, the IT assets 106 of the IT infrastructure 105 are owned or operated by the same enterprise that operates the search engine platform 110. In other embodiments, the IT assets 106 of the IT infrastructure 105 may be owned or operated by one or more enterprises different than the enterprise which operates the search engine platform 110 (e.g., a first enterprise provides search functionality support for multiple different customers, businesses, etc.). Various other examples are possible.

In some embodiments, the client devices 102 and/or the IT assets 106 of the IT infrastructure 105 may implement host agents that are configured for automated transmission of information with the document database 108 and the search engine platform 110 regarding searches (e.g., queries, answers to queries, etc.). It should be noted that a "host agent" as this term is generally used herein may comprise an automated entity, such as a software entity running on a processing device. Accordingly, a host agent need not be a human entity.

The search engine platform 110 in the FIG. 1 embodiment is assumed to be implemented using at least one processing device. Each such processing device generally comprises at least one processor and an associated memory, and implements one or more functional modules or logic for controlling certain features of the search engine platform 110. In the FIG. 1 embodiment, the search engine platform 110 implements a machine learning-based document search tool 112. The machine learning-based document search tool 112 comprises query parsing logic 114, document chunk generation with tabular data structure comprehension logic 116, and machine learning-based answer generation logic 118. The query parsing logic 114 is configured to obtain queries, where a given query comprises search text and a context, the context identifying one or more documents (e.g., from the document database 108) to be searched using the search text. The one or more documents are assumed to include at least one document that comprises one or more tabular data structures (e.g., tables). The document chunk generation with tabular data structure comprehension logic 116 is configured to generate a plurality of document chunks by parsing the one or more documents. Each of the plurality of document chunks comprises a portion of content of one of the one or more documents. The one or more tabular data structures of the one or more documents are replaced, in ones of the plurality of document chunks whose content includes the one or more tabular data structures, with tabular data structure representations that maintain a tabular formatting of the one or more tabular data structures. The machine learning-based answer generation logic 118 is configured to select a subset of the plurality of document chunks based at least in part on determining a similarity between content of the plurality of document chunks and the search text, the selected subset of the plurality of document chunks comprising at least one document chunk comprising at least one of the one or more tabular data structures. The machine learning-based answer generation logic 118 is also configured to generate, based at least in part on the query, a prompt for input to a machine learning system (e.g., a large language model (LLM)), the prompt comprising the selected subset of the plurality of document chunks. The machine learning-based answer generation logic 118 is further configured to apply the prompt to the machine learning system to generate an output, and to provide an answer to the query based at least in part on the output of the machine learning system, the answer comprising content of at least one of the one or more tabular data structures.

At least portions of the machine learning-based document search tool 112, the query parsing logic 114, the document chunk generation with tabular data structure comprehension logic 116 and the machine learning-based answer generation logic 118 may be implemented at least in part in the form of software that is stored in memory and executed by a processor.

It is to be appreciated that the particular arrangement of the client devices 102, the IT infrastructure 105, the document database 108 and the search engine platform 110 illustrated in the FIG. 1 embodiment is presented by way of example only, and alternative arrangements can be used in other embodiments. As discussed above, for example, the search engine platform 110 (or portions of components thereof, such as one or more of the machine learning-based document search tool 112, the query parsing logic 114, the document chunk generation with tabular data structure comprehension logic 116 and the machine learning-based answer generation logic 118) may in some embodiments be implemented internal to the IT infrastructure 105.

The search engine platform 110 and other portions of the information processing system 100, as will be described in further detail below, may be part of cloud infrastructure.

The search engine platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the IT assets 106, the document database 108 and the search engine platform 110 or components thereof (e.g., the machine learning-based document search tool 112, the query parsing logic 114, the document chunk generation with tabular data structure comprehension logic 116 and the machine learning-based answer generation logic 118) may be implemented on respective distinct processing platforms, although numerous other arrangements are possible. For example, in some embodiments at least portions of the search engine platform 110 and one or more of the client devices 102, the IT infrastructure 105, the IT assets 106 and/or the document database 108 are implemented on the same processing platform. A given client device (e.g., 102-1) can therefore be implemented at least in part within at least one processing platform that implements at least a portion of the search engine platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the document database 108 and the search engine platform 110, or portions or components thereof, to reside in different data centers. Numerous other distributed implementations are possible. The search engine platform 110 can also be implemented in a distributed manner across multiple data centers.

Additional examples of processing platforms utilized to implement the search engine platform 110 and other components of the information processing system 100 in illustrative embodiments will be described in more detail below in conjunction with FIGS. 11 and 12.

It is to be understood that the particular set of elements shown in FIG. 1 for machine learning-based query processing of documents including tabular data structures is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
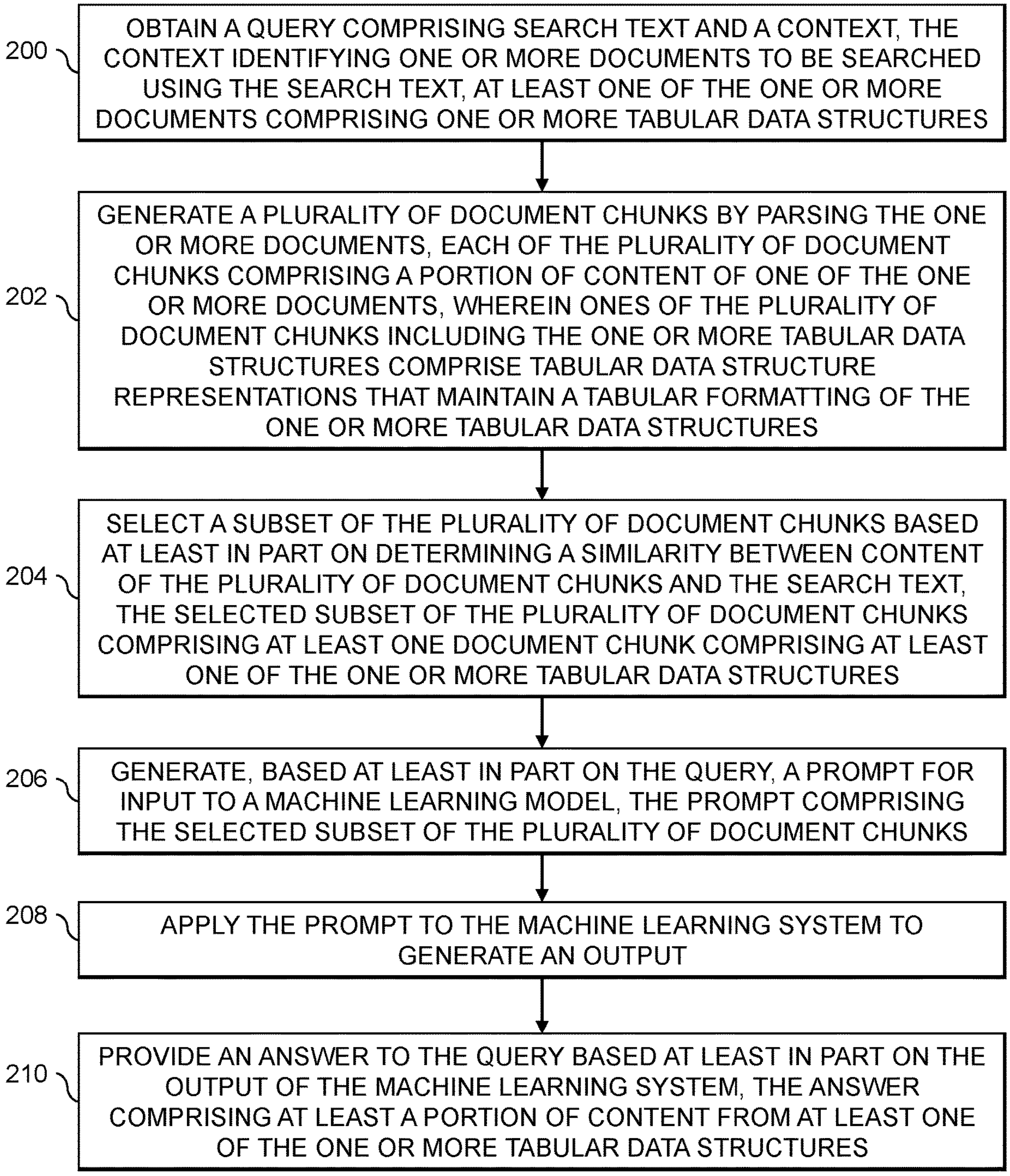
FIG. 2 is a flow diagram of an exemplary process for machine learning-based query processing of documents including tabular data structures in an illustrative embodiment.

An exemplary process for machine learning-based query processing of documents including tabular data structures will now be described in more detail with reference to the flow diagram of FIG. 2. It is to be understood that this particular process is only an example, and that additional or alternative processes for machine learning-based query processing of documents including tabular data structures may be used in other embodiments.

In this embodiment, the process includes steps 200 through 210. These steps are assumed to be performed by the search engine platform 110 utilizing the machine learning-based document search tool 112, the query parsing logic 114, the document chunk generation with tabular data structure comprehension logic 116 and the machine learning-based answer generation logic 118. The process begins with step 200, obtaining a query comprising search text and a context, the context identifying one or more documents to be searched using the search text, at least one of the one or more documents comprising one or more tabular data structures. The query may be directed to performing configuration of an IT asset, and the one or more documents comprise one or more technical guides for the IT asset. The query may alternatively be directed to performing at least one of troubleshooting and remediation of one or more issues encountered on an IT asset, and the one or more documents may comprise one or more support tickets associated with the one or more issues encountered on the IT asset.

In step 202, a plurality of document chunks are generated by parsing the one or more documents. Each of the plurality of document chunks comprises a portion of content of one of the one or more documents. The one or more tabular data structures are replaced, in ones of the plurality of document chunks whose portion of the content of the one or more documents includes such tabular data structures, with tabular data structure representations that maintain a tabular formatting of the one or more tabular data structures.

In step 204, a subset of the plurality of document chunks are selected based at least in part on determining a similarity between content of the plurality of document chunks and the search text, the selected subset of the plurality of document chunks comprising at least one document chunk comprising at least one of the one or more tabular data structures.

In step 206, a prompt for input to a machine learning system is generated based at least in part on the query. The prompt comprises the selected subset of the plurality of document chunks. The machine learning system may comprise an LLM, and generating the prompt for input to the machine learning system may comprise utilizing a prompt template that instructs the LLM to recognize the tabular data structure representations and include content of relevant ones of the one or more tabular data structures in the output of the machine learning system.

In step 208, the prompt is applied to the machine learning system to generate an output.

In step 210, an answer to the query is provided based at least in part on an output of the machine learning system. The answer comprises at least a portion of content from at least one of the one or more tabular data structures.

For a given one of the plurality of document chunks generated for a given one of the one or more documents including a given one of the one or more tabular data structures, a given tabular data structure representation for the given tabular data structure may comprise a plain-text representation of the tabular formatting of the given tabular data structure. Generating the given document chunk may comprise determining coordinates of the given tabular data structure relative to surrounding text in a given one of the plurality of document chunks, extracting the given tabular data structure from the given document chunk, extracting textual content and layout of the given tabular data structure, and inserting the extracted textual content of the given tabular data structure into the given document chunk at the determined coordinates in accordance with the extracted layout. The determined coordinates may comprise a horizontal alignment of the given tabular data structure in the given document.

For a given one of the plurality of document chunks generated for a given one of the one or more documents including a given one of the one or more tabular data structures, a given tabular data structure representation for the given tabular data structure may comprises a placeholder for the given tabular data structure. Generating the given document chunk may comprise determining a tabular data structure identifier for the given tabular data structure, determining coordinates of the given tabular data structure relative to surrounding text in a given one of the plurality of document chunks, and inserting, into the given document chunk, the placeholder for the given tabular data structure at the determined coordinates, the placeholder including a reference to the determined tabular data structure identifier. Generating the answer to the query may comprise augmenting the output of the machine learning system with an original version of the given tabular data structure extracted from the given document responsive to determining that textual content of the output of the machine learning system is sourced from the given tabular data structure. Generating the given document chunk may further comprise determining a textual description for the given tabular data structure, and augmenting the output of the machine learning system may comprise selecting the given tabular data structure from among multiple tabular data structures in the given document chunk responsive to determining that a similarity between the search text of the query and the textual description for the given tabular data structure exceeds a designated similarity threshold. Determining the textual description may comprise extracting a table caption for the given tabular data structure. Determining the textual description may also or alternatively comprise applying at least one of natural language processing summarization and natural language processing topic extraction to textual content of the given tabular data structure.

For a given one of the plurality of document chunks generated for a given one of the one or more documents including a given one of the one or more tabular data structures, a given tabular data structure representation for the given tabular data structure may comprise one or more image placeholders for one or more images included in the given tabular data structure. Generating the answer to the query may comprise augmenting the output of the machine learning system with an original version of at least a given one of the one or more images responsive to determining that textual content of the output of the machine learning system is sourced from a portion of the given tabular data structure associated with the given image.

Large Language Models (LLMs), such as the OpenAI Chat Generative Pre-Trained Transformer (ChatGPT) model, are a type of machine learning model that can provide a better alternative to traditional search engines in helping users find pieces of information that they are looking for, and in providing more concise and relevant answers, albeit with a risk that the answers may be irrelevant or incorrect. The query that a user types is given as input to the LLM, along with an appropriate context, which is the text that the LLM should "search" for an answer. This is referred to as prompt engineering. A problem with this approach is that the size of the prompt is limited. For example, the limit for GPT3.5-Turbo is 4,096 tokens, and for GPT4 it is 8,192 tokens. The input documents can often be orders of magnitude larger than this limit. For example, a user may utilize an LLM to query product guides for IT assets, where the product guides are orders of magnitude larger than such limits (e.g., tens or hundreds of pages). Thus, an approach referred to as Retrieval Augmented Generation (RAG) may be used to break the input documents into chunks that are small enough to fit the prompt size limitations. For a given query, RAG combines the most relevant chunks together with the query as the input prompt to the LLM, which presents answers to the user.

A major challenge with the RAG approach is how to perform the chunking, indexing and matching effectively such that the LLM output at the end of the process will provide correct and useful answers. In some embodiments, techniques may be used which are based on comprehension of the input document's structure (e.g., the Document Object Model (DOM) of a document). Such an approach can greatly improve the relevance of the chunks and the match between queries and the chunks, thus improving the overall quality of the question answering process and user satisfaction.

An additional limitation of LLMs is that they can only take plain (e.g., unformatted) text as input. In some embodiments, approaches are used to address the challenge of enhancing text-only answers provided by an LLM with relevant images. Such approaches enable the extraction and indexing of images relative to text chunks, matching images with queries and answers, and formatting the answers to incorporate images in a way that will maximize user benefit and satisfaction.

Illustrative embodiments provide technical solutions for addressing data structures often found in documents, such as tables. In conventional approaches, a default RAG implementation (e.g., the LangChain library) treats table data the same as non-tabular text such as a paragraph. Such an approach, however, suffers from various technical problems. Consider, as an example, the table 300 shown in FIG. 3A, which may be input to an LLM along with the query 310 shown in FIG. 3B ("What can be different Embedded LED states for a Node Fault along with the description?"). A conventional RAG implementation, which does not provide comprehension of the tabular structure of the table 300, treats the data of the table 300 like normal text which is read line by line. Thus, for example, the text shown in the dashed outline 305 of FIG. 3A is read as one piece. As a result, the LLM will provide the wrong answer 315 shown in FIG. 3B to the query 310. The technical solutions described herein allow for incorporating tabular structure comprehension and text formatting into LLMs, and also enable the ability for presenting answers from the LLM as either plain text or formatted text (e.g., in HyperText Markup Language (HTML) format). Using the technical solutions described herein, the LLM is able to provide the correct answer 320 shown in FIG. 3B to the query 310.

The technical solutions in some embodiments are configured to enhance RAG approaches to handle data structures which are in table or tabular format. Thus, the technical solutions are able to insert tables into the LLM input (e.g., context) in plain text, properly formatted and positioned. In some embodiments, the technical solutions allow for inserting tables or portions thereof in their original format into the LLM output. As a preprocessing step, tables are indexed relative to the text chunks which are processed by the LLM. The LLM is instructed, via the prompt, so that when parts of a text chunk are provided as an answer, relevant table placeholders are included in the answer. As a postprocessing step, any table placeholder in the answer is replaced with the actual table data (e.g., at least a portion of a table). Using table captions and similarity with the query, the technical solutions are able to choose which tables, if any, to insert into the answer. The technical solutions can also support data structures such as image-containing tables.

Default handling of tabular data structures using the RAG approach will now be described. A data extraction procedure (e.g., for extracting data from documents in Portable Document Format (PDF)) involves extracting the text present line by line or word by word, and combining these words or lines to form the complete text. This procedure is followed by various software libraries, including the LangChain library. This approach can lead to incorrect output when structured data like tables are present within PDF pages. FIG. 4 shows an example of a table 400 which is converted to unformatted text 405 using a PDF data extraction procedure. As shown in FIG. 4, this default text extraction loses the structure of the table 400, which is why answers related to table information can be completely wrong. Some software libraries, such as PDFPlumber and PDFMiner, are capable of extracting tables from PDFs while retaining the tabular structure. Such libraries, however, do not support extraction of the complete PDF page layout, including both text and tables.

The technical solutions described herein enable the extraction of tabular data while taking into account the overall layout of documents, where the documents may be in various different document formats such as PDF, HTML, etc. Advantageously, the technical solutions consider both text and table content, along with their alignment within a document. This is carried out by taking the coordinates of the text and tables. Using the coordinates as reference, the tables are first extracted and cropped out of the PDF content. Next, the textual content is extracted. The tabular structure is then merged with the text extracted from the document based on the bounding coordinates of both elements, forming the final layout which resembles the source document layout. The combined text and table content is then passed to the LLM, enabling an enhanced RAG approach with table comprehension that achieves much better results for queries related to tabular data. FIG. 5A shows a sample document 500, which includes the table 400 shown in FIG. 4 and surrounding text and images. FIG. 5B shows extracted content 505 for the sample document 500. Advantageously, the extracted content 505 maintains the correct table layout of the table 400, enabling queries against the data of the table 400 to be answered correctly.

The techniques described above enable conversion of tabular data to plain text. As an alternative, some embodiments extract tables from source documents in their entirety, keeping the data as well as the format of the tables. This alternative has the advantage of presenting the output to the user with properly formatted tables (e.g., as the tables appear in the original or source documents). However, this alternative entails an additional postprocessing step on the LLM output (e.g., replacing a table placeholder with the table content as described in further detail below). FIG. 6 shows an example 600 with a query and answer, where the query is the same as the query 310 shown in FIG. 3B based on the table 300 of FIG. 3A as input or context. The answer is the correct answer 320, supplemented with the actual table data for the table 300.

An enhanced RAG approach with table comprehension will now be described, which includes table indexing, generation of table placeholders, and insertion of formatted tables into the answers or other output from an LLM. Table indexing includes, for each table that appears in a source document, saving various information such as: (1) a document name of the source document; (2) a table identifier from the source document, if available, otherwise a running number is used; (3) a table caption; (4) a table size and optionally a positioning of the table (e.g., left, centered, right); (5) the table content itself (e.g., as a binary large object (BLOB) or link to a file); (6) a character offset from a beginning of the source document; (7) a document chunk that includes the table (e.g., with a DOM-based method, the lowest level document chunk including the table); and (8) a character offset from the beginning of the document chunk that includes the table. Every table that appears inside a chunk of text is then replaced by a placeholder that has a unique pattern and includes a reference to the specific table identifier. For example, "|Table 1" may be used as a placeholder. The table identifier is taken from the source document if available (e.g., "Table 3" in the sample document 500 shown in FIG. 5A), otherwise a running number per document is used. As a postprocessing step, in every answer provided by the LLM, any table placeholders in the answer are replaced with the actual tables, keeping to the extent possible the original table size and position.

The technical solutions may also implement prompt manipulation utilizing a prompt template to guarantee that an LLM (e.g., ChatGPT 3.5) will include the relevant table (e.g., the table content itself and/or table placeholders) in the answer. The details of the dialog could vary with different LLMs, but the principle remains the same—instructing the LLM to include all (and only) relevant tables in the answer. FIG. 7 shows an example 700 of prompt engineering for an LLM.

Figure 8:
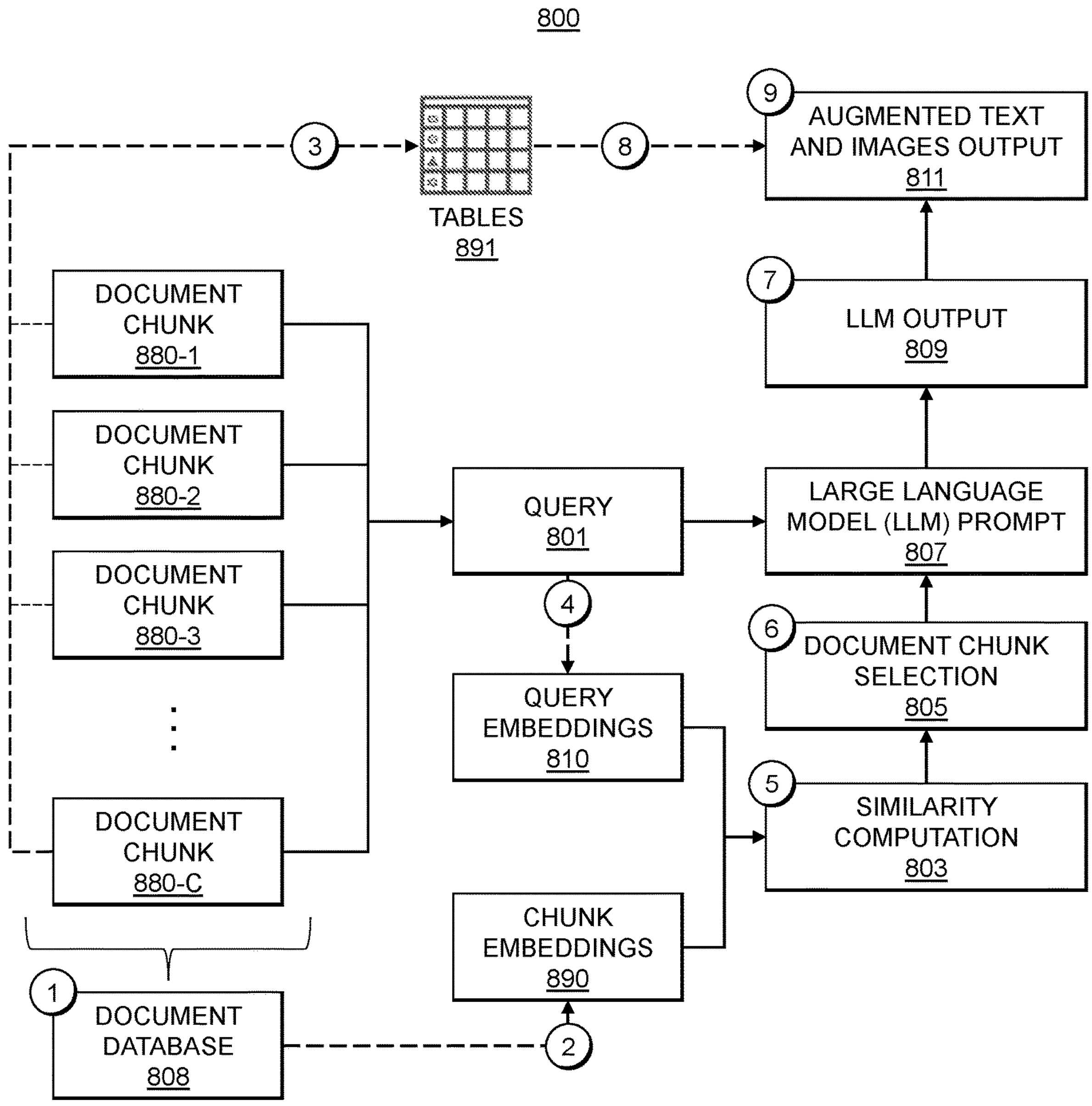
FIG. 8 shows a system flow for implementing an enhanced retrieval augmented generation approach with table comprehension for querying a large language model in an illustrative embodiment.

FIG. 8 shows a system flow 800 for implementing an enhanced RAG approach with table comprehension. The system flow 800 includes the following steps:

1. Ingesting a collection of one or more input documents from a document database 808, and breaking down the input documents into document chunks 808-1, 880-2, 880-3, . . . 880-C (collectively, document chunks 880).
2. Each of the document chunks 880 is indexed using word embeddings, represented as chunk embeddings 890.
3. Tables 891 from the input documents are extracted and indexed. Using a plain-text approach, the tables 891 are converted into "faithful" text representations (e.g., as shown in the extracted content 505 of FIG. 5B, rather than an unformatted text representation as shown in extracted content 505 of FIG. 5B). Using the full-format approach, the tables 891 are indexed separately keeping both their data as well as their format, and inserting table placeholders into the document chunks 880 from which the tables 891 originated.
4. Given a user query 801, the text of the query 801 is transformed into a vector of embeddings, represented as query embeddings 810.
5. A similarity 803 between the query 801 and the document chunks 880 is computed, to find a small set of the document chunks 880 that are most similar (e.g., relevant) to the query 801. The similarity 803 may be computed based on the query embeddings 810 and the chunk embeddings 890, with the computed similarities being used in document chunk selection 805.
6. The query 801 and the selected document chunks 880 are combined into a prompt to the LLM 807. This prompt may use prompt engineering as described above.
7. The LLM provides output 809.
8. With the full-format approach, one or more of the related tables 891 are fetched.
9. With the full-format approach, post-processing is applied to generate an augmented text and images output 811. Based on the output scope, related tables are found using a similarity search on the table contents and captions. Relevant tables, if any, are obtained in step 8 and are inserted and the augmented answer is presented to the user.

In some embodiments, an answer from the LLM that is presented to the user includes plain text generated by the LLM which is augmented with the tables that were included in the scope of such text in a relevant one or ones of the document chunks 809 in the original source or input document. In most cases, this approach works well. However, in some cases only certain tables include relevant information while others may be superfluous or even confusing. FIG. 9A, for example, shows a document 900 including two tables. Clearly, if the user is asking "What are the guidelines for powering on the system while adding a second expansion enclosure" it would be better to present an answer with only the second table (Table 2: Adding expansion enclosures to a running system), without including the first table (Table 1: Installing expansion enclosures during the initial system installation). As shown in FIG. 9B, the technical solutions do just that in output 905 (e.g., including the second table but not the first table in the answer). To do so, in cases where table captions are available in the source or input documents, the determination of relevant tables may be achieved by performing a similarity match of each candidate table caption versus the query text, and retaining tables (e.g., table placeholders) whose captions match the query above a designated threshold. When table captions are not available, machine learning algorithms such as Natural Language Processing (NLP) summarization and topic extraction may be used to generate captions for tables.

Another use case includes data structures where tables contain images. As an example, FIG. 10 shows a table 1000 which includes images. Consider, for the table 1000, a query such as "What are the cable management arms?". With a conventional RAG methodology, the relevant images will not be extracted and presented. The technical solutions described herein can provide an enhanced RAG approach with table comprehension, including comprehension of image-containing tables, which enables an LLM to provide correct answers including images where appropriate, properly formatted and positioned.

The technical solutions described herein advantageously provide novel and innovative approaches for enhancing LLMs to provide users with relevant answers based on table data. The LLMs may present the answers as plain text or formatted text.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for machine learning-based query processing of documents including tabular data structures will now be described in greater detail with reference to FIGS. 11 and 12. Although described in the context of system 100, these platforms may also be used to implement at least portions of other information processing systems in other embodiments.

Figure 11:
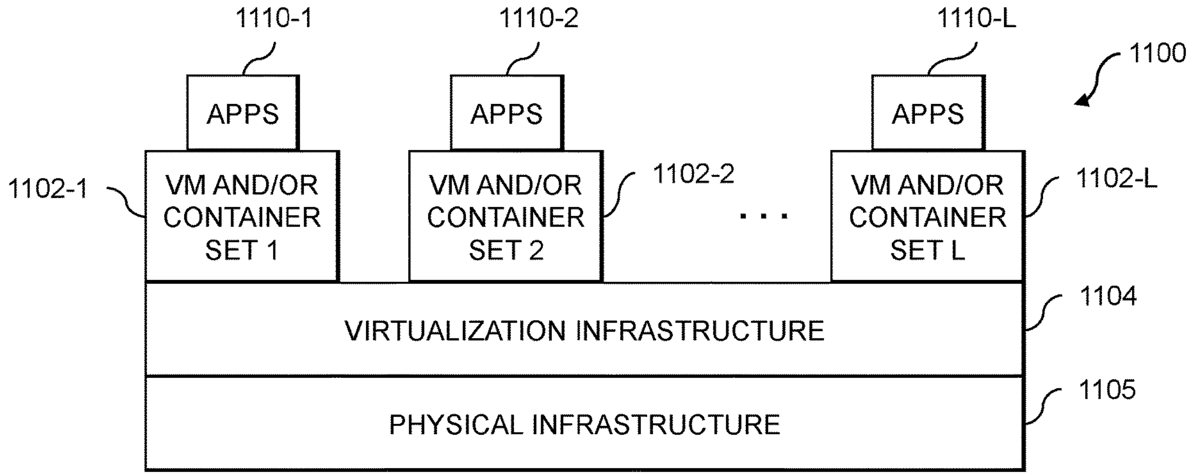
FIGS. 11 and 12 show examples of processing platforms that may be utilized to implement at least a portion of an information processing system in illustrative embodiments.
Figure 12:
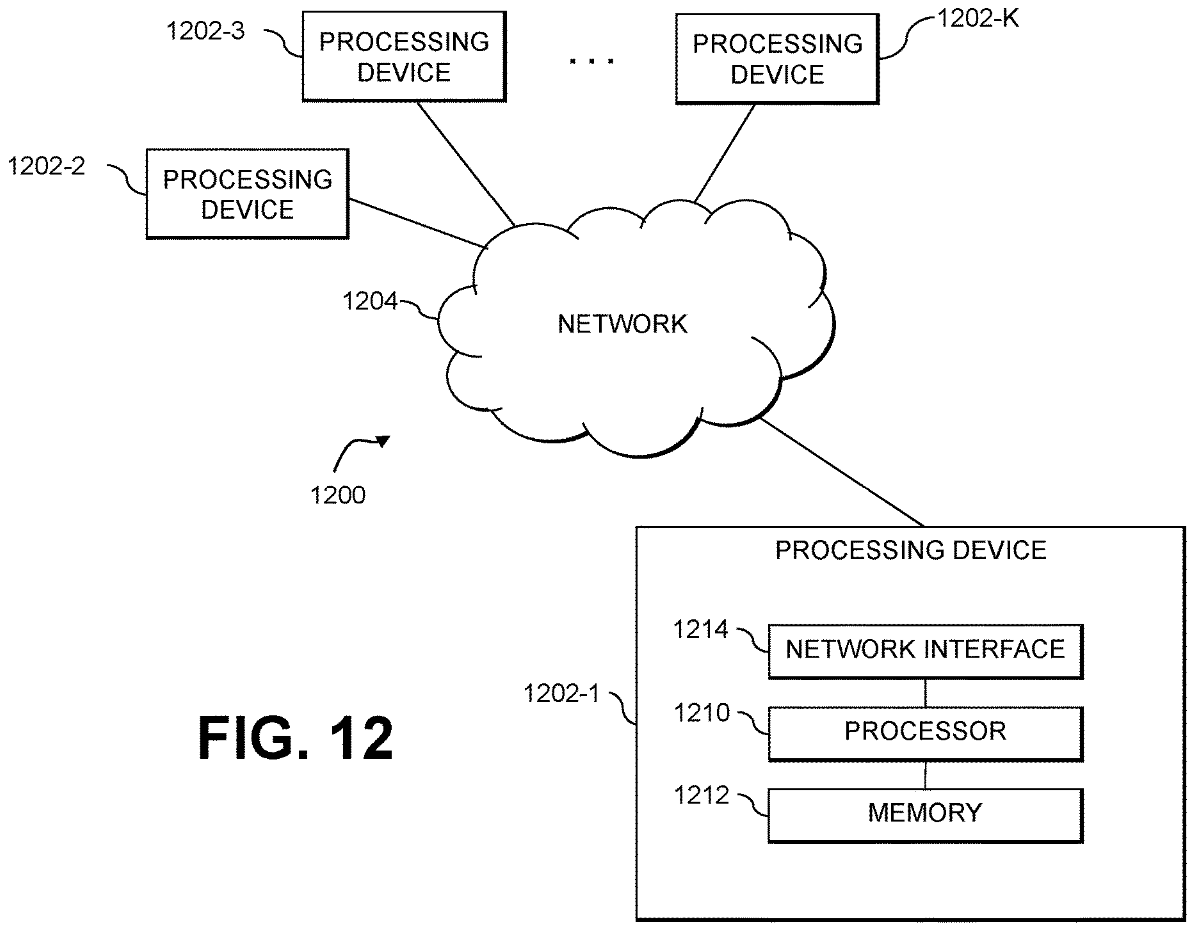

FIG. 11 shows an example processing platform comprising cloud infrastructure 1100. The cloud infrastructure 1100 comprises a combination of physical and virtual processing resources that may be utilized to implement at least a portion of the information processing system 100 in FIG. 1. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for machine learning-based query processing of documents including tabular data structures as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to obtain a query, the query comprising search text and a context, the context identifying one or more documents to be searched using the search text, at least one of the one or more documents comprising one or more tabular data structures;

to generate a plurality of document chunks by parsing the one or more documents, each of the plurality of document chunks comprising a portion of content of one of the one or more documents, wherein the one or more tabular data structures are replaced in the plurality of document chunks by one or more tabular data structure representations that maintain a tabular formatting of the one or more tabular data structures;

to maintain a tabular data structure index for the one or more tabular data structures, the tabular data structure index comprising, for a given one of the one or more tabular data structures in a given one of the plurality of document chunks: (i) at least one of a binary large object (BLOB) comprising content of the given tabular data structure and a link to a file comprising the content of the given tabular data structure; (ii) a given tabular data structure identifier for the given tabular data structure; (iii) a given document identifier of a given one of the one or more documents containing the given document chunk; (iv) a given document chunk identifier of the given document chunk containing the given tabular data structure; (v) a size and positioning of the given tabular data structure; and (vi) a character offset of the given tabular data structure relative to at least one of a start of the given document and a start of the given document chunk;

to select a subset of the plurality of document chunks based at least in part on determining a similarity between content of the plurality of document chunks and the search text, the selected subset of the plurality of document chunks comprising at least one document chunk comprising at least one of the one or more tabular data structure representations;

to generate, based at least in part on the query, a prompt for input to a machine learning system, the prompt comprising the selected subset of the plurality of document chunks;

to apply the prompt to the machine learning system to generate an output; and to provide an answer to the query based at least in part on the output of the machine learning system, the answer comprising at least a portion of content from at least one of the one or more tabular data structures, the portion of the content from said at least one of the one or more tabular data structures being retrieved utilizing the tabular data structure index;

wherein generating the given document chunk comprising a given portion of content of the given document including the given tabular data structure, the given tabular data structure comprising first textual content, comprises:

determining an alignment of the given tabular data structure in the given portion of the content of the given document relative to additional textual content of the given portion of the content of the given document;

extracting the given tabular data structure from the given portion of the content of the given document;

generating a plain-text representation of the first textual content and the tabular formatting of the given tabular data structure;

extracting the additional textual content from the given portion of the content of the given document; and generating the given document chunk by merging the plain-text representation of the first textual content and the tabular formatting of the given tabular data structure with the additional textual content extracted from the given portion of the content of the given document while maintaining the determined alignment.

2. The apparatus of claim 1 wherein the given tabular data structure representation for the given tabular data structure comprises a placeholder for the given tabular data structure.

3. The apparatus of claim 2 wherein generating the answer to the query comprises augmenting the output of the machine learning system with an original version of the given tabular data structure extracted from the given document responsive to determining that textual content of the output of the machine learning system is sourced from the given tabular data structure.

4. The apparatus of claim 3 wherein generating the given document chunk further comprises determining a textual description for the given tabular data structure, and wherein augmenting the output of the machine learning system comprises selecting the given tabular data structure from among multiple tabular data structures in the given document chunk responsive to determining that a similarity between the search text of the query and the textual description for the given tabular data structure exceeds a designated similarity threshold.

5. The apparatus of claim 4 wherein determining the textual description comprises extracting a table caption for the given tabular data structure.

6. The apparatus of claim 4 wherein determining the textual description comprises applying at least one of natural language processing summarization and natural language processing topic extraction to the first textual content of the given tabular data structure.

7. The apparatus of claim 2 wherein generating the given document chunk comprises:

determining the given tabular data structure identifier for the given tabular data structure;

determining coordinates of the given tabular data structure relative to the additional textual content in the given document chunk; and inserting, into the given document chunk, the placeholder for the given tabular data structure at the determined coordinates, the placeholder including a reference to the determined given tabular data structure identifier.

8. The apparatus of claim 1 wherein determining the alignment of the given tabular data structure in the given portion of the content of the given document relative to the additional textual content of the given portion of the content of the given document comprises determining coordinates of the given tabular data structure relative to the additional textual content in the given document chunk, and wherein generating the given document chunk by merging the plain-text representation of the first textual content and the tabular formatting of the given tabular data structure with the additional textual content extracted from the given portion of the content of the given document while maintaining the determined alignment comprises inserting the plain-text representation of the first textual content and the tabular formatting of the given tabular data structure into the given document chunk at the determined coordinates.

9. The apparatus of claim 8 wherein the determined coordinates comprise a horizontal alignment of the given tabular data structure in the given document chunk.

10. The apparatus of claim 1 wherein the machine learning system comprises a large language model, and wherein generating the prompt for input to the machine learning system comprises utilizing a prompt template that instructs the large language model to recognize the tabular data structure representations and include content of relevant ones of the one or more tabular data structures in the output of the machine learning system.

11. The apparatus of claim 1 wherein the given tabular data structure representation for the given tabular data structure further comprises one or more image placeholders for one or more images included in the given tabular data structure, and wherein generating the answer to the query comprises augmenting the output of the machine learning system with an original version of at least a given one of the one or more images responsive to determining that textual content of the output of the machine learning system is sourced from a portion of the given tabular data structure associated with the given image.

12. The apparatus of claim 1 wherein the query is directed to performing configuration of an information technology asset, and wherein the one or more documents comprise one or more technical guides for the information technology asset.

13. The apparatus of claim 1 wherein the query is directed to performing at least one of troubleshooting and remediation of one or more issues encountered on an information technology asset, and wherein the one or more documents comprise one or more support tickets associated with the one or more issues encountered on the information technology asset.

14. A computer program product comprising a non-transitory processor-readable storage medium having stored therein program code of one or more software programs, wherein the program code when executed by at least one processing device causes the at least one processing device:

to obtain a query, the query comprising search text and a context, the context identifying one or more documents to be searched using the search text, at least one of the one or more documents comprising one or more tabular data structures;

to generate a plurality of document chunks by parsing the one or more documents, each of the plurality of document chunks comprising a portion of content of one of the one or more documents, wherein the one or more tabular data structures are replaced in the plurality of document chunks by one or more tabular data structure representations that maintain a tabular formatting of the one or more tabular data structures;

to maintain a tabular data structure index for the one or more tabular data structures, the tabular data structure index comprising, for a given one of the one or more tabular data structures in a given one of the plurality of document chunks: (i) at least one of a binary large object (BLOB) comprising content of the given tabular data structure and a link to a file comprising the content of the given tabular data structure; (ii) a given tabular data structure identifier for the given tabular data structure; (iii) a given document identifier of a given one of the one or more documents containing the given document chunk; (iv) a given document chunk identifier of the given document chunk containing the given tabular data structure; (v) a size and positioning of the given tabular data structure; and (vi) a character offset of the given tabular data structure relative to at least one of a start of the given document and a start of the given document chunk;

to select a subset of the plurality of document chunks based at least in part on determining a similarity between content of the plurality of document chunks and the search text, the selected subset of the plurality of document chunks comprising at least one document chunk comprising at least one of the one or more tabular data structure representations;

to generate, based at least in part on the query, a prompt for input to a machine learning system, the prompt comprising the selected subset of the plurality of document chunks;

to apply the prompt to the machine learning system to generate an output; and to provide an answer to the query based at least in part on the output of the machine learning system, the answer comprising at least a portion of content from at least one of the one or more tabular data structures, the portion of the content from said at least one of the one or more tabular data structures being retrieved utilizing the tabular data structure index;

wherein generating the given document chunk comprising a given portion of content of the given document including the given tabular data structure, the given tabular data structure comprising first textual content, comprises:

determining an alignment of the given tabular data structure in the given portion of the content of the given document relative to additional textual content of the given portion of the content of the given document;

extracting the given tabular data structure from the given portion of the content of the given document;

generating a plain-text representation of the first textual content and the tabular formatting of the given tabular data structure;

extracting the additional textual content from the given portion of the content of the given document; and generating the given document chunk by merging the plain-text representation of the first textual content and the tabular formatting of the given tabular data structure with the additional textual content extracted from the given portion of the content of the given document while maintaining the determined alignment.

15. The computer program product of claim 14 wherein the given tabular data structure representation for the given tabular data structure comprises a placeholder for the given tabular data structure.

16. A method comprising:

obtaining a query, the query comprising search text and a context, the context identifying one or more documents to be searched using the search text, at least one of the one or more documents comprising one or more tabular data structures;

generating a plurality of document chunks by parsing the one or more documents, each of the plurality of document chunks comprising a portion of content of one of the one or more documents, wherein the one or more tabular data structures are replaced in the plurality of document chunks by one or more tabular data structure representations that maintain a tabular formatting of the one or more tabular data structures;

maintaining a tabular data structure index for the one or more tabular data structures, the tabular data structure index comprising, for a given one of the one or more tabular data structure representations in a given one of the plurality of document chunks: (i) at least one of a binary large object (BLOB) comprising content of the given tabular data structure and a link to a file comprising the content of the given tabular data structure; (ii) a given tabular data structure identifier for the given tabular data structure; (iii) a given document identifier of a given one of the one or more documents containing the given document chunk; (iv) a given document chunk identifier of the given document chunk containing the given tabular data structure; (v) a size and positioning of the given tabular data structure; and (vi) a character offset of the given tabular data structure relative to at least one of a start of the given document and a start of the given document chunk;

selecting a subset of the plurality of document chunks based at least in part on determining a similarity between content of the plurality of document chunks and the search text, the selected subset of the plurality of document chunks comprising at least one document chunk comprising at least one of the one or more tabular data structure representations;

generating, based at least in part on the query, a prompt for input to a machine learning system, the prompt comprising the selected subset of the plurality of document chunks;

applying the prompt to the machine learning system to generate an output; and providing an answer to the query based at least in part on the output of the machine learning system, the answer comprising at least a portion of content from at least one of the one or more tabular data structures, the portion of the content from said at least one of the one or more tabular data structures being retrieved utilizing the tabular data structure index;

wherein generating the given document chunk comprising a given portion of content of the given document including the given tabular data structure, the given tabular data structure comprising first textual content, comprises:

determining an alignment of the given tabular data structure in the given portion of the content of the given document relative to additional textual content of the given portion of the content of the given document;

extracting the given tabular data structure from the given portion of the content of the given document;

generating a plain-text representation of the first textual content and the tabular formatting of the given tabular data structure;

extracting the additional textual content from the given portion of the content of the given document; and generating the given document chunk by merging the plain-text representation of the first textual content and the tabular formatting of the given tabular data structure with the additional textual content extracted from the given portion of the content of the given document while maintaining the determined alignment; and wherein the method is performed by at least one processing device comprising a processor coupled to a memory.

17. The method of claim 16 wherein the given tabular data structure representation for the given tabular data structure comprises a placeholder for the given tabular data structure.

18. The method of claim 17 wherein generating the answer to the query comprises augmenting the output of the machine learning system with an original version of the given tabular data structure extracted from the given document responsive to determining that textual content of the output of the machine learning system is sourced from the given tabular data structure.

19. The method of claim 18 wherein generating the given document chunk further comprises determining a textual description for the given tabular data structure, and wherein augmenting the output of the machine learning system comprises selecting the given tabular data structure from among multiple tabular data structures in the given document chunk responsive to determining that a similarity between the search text of the query and the textual description for the given tabular data structure exceeds a designated similarity threshold.

20. The method of claim 17 wherein generating the given document chunk comprises:

determining the given tabular data structure identifier for the given tabular data structure;

determining coordinates of the given tabular data structure relative to the additional textual content in the given document chunk; and inserting, into the given document chunk, the placeholder for the given tabular data structure at the determined coordinates, the placeholder including a reference to the given tabular data structure identifier.

* * * * *